Fig. 1.

C. McC. CHAPMAN.
CONVERTIBLE THREAD DRAWING AND HEMSTITCHING MACHINE.
APPLICATION FILED NOV. 14, 1911.

1,202,805.

Patented Oct. 31, 1916.
6 SHEETS—SHEET 2.

WITNESSES

INVENTOR

C. McC. CHAPMAN.
CONVERTIBLE THREAD DRAWING AND HEMSTITCHING MACHINE.
APPLICATION FILED NOV. 14, 1911.

1,202,805.

Patented Oct. 31, 1916.
6 SHEETS—SHEET 4.

Fig. 5.

WITNESSES

INVENTOR

UNITED STATES PATENT OFFICE.

CHARLES McC. CHAPMAN, OF MORRISTOWN, NEW JERSEY.

CONVERTIBLE THREAD-DRAWING AND HEMSTITCHING MACHINE.

1,202,805.     Specification of Letters Patent.     Patented Oct. 31, 1916.

Application filed November 14, 1911. Serial No. 660,171.

*To all whom it may concern:*

Be it known that I, CHARLES McC. CHAPMAN, a citizen of the United States, residing in Morristown, county of Morris, and State of New Jersey, have invented a new and useful Improvement in Convertible Thread-Drawing and Hemstitching Machines, of which the following is a description.

This invention relates to machines for producing drawn or open work, and particularly to machines which are convertible from a simple thread-drawing machine into a combination thread-drawing and hemstitching machine, and vice versa.

Among the objects of my invention may be noted the following: To provide a high-speed thread-drawing, and combination thread-drawing and hemstitching, machine which will be simple, compact, positive in operation and durable; to provide a machine which will draw threads from fabric and simultaneously hemstitch either one or both edges of the thread-drawn line during a progressive feed of the work through the machine; to provide a machine which can be converted into a simple thread-drawing machine from a combination thread-drawing and hemstitching machine, and vice versa, and which, when operated as a combination thread-drawing and hemstitching machine, can be made to cover either one or both edges of the thread-drawn line; to provide a thread-drawing machine in which the active element of the thread-cutting mechanism is arranged to cut the deflected threads by a movement in the general direction of the feed of the work; to provide a simple and positive thread-cutting mechanism specially applicable to a thread-drawing machine, which can be regulated or adjusted conveniently, and positively set in proper position for effective action; to provide a thread-cutting mechanism for thread-drawing machines in which the stationary or ledger blade is positively set in position for coöperative action with the movable blade in such manner that it cannot be displaced during operation and can always be set in the same position for operation; to provide improved means for actuating the thread-deflecting blade; to provide means by which the thread-deflecting blade can be put out of action at any time desired; to provide a combination of elements by which the needle-bar, thread-deflector bar and take-up may be operated effectively without interference with each other; to provide a combination of means by which the cutting mechanism is enabled to cut the deflected threads so close to the work as to leave practically no fuzz along the thread-drawn line; and to provide many details of construction which go to perfect and simplify the machine, both as a simple thread-drawing machine and as a combination thread-drawing and hemstitching machine, render it accurate in operation and effective for the purposes intended.

With the above objects in view, and others which will be detailed during the course of this description, my invention consists in the features, elements, parts and mechanisms and combinations thereof, all as hereinafter described and claimed.

In order that my invention may be clearly understood, I have provided drawings wherein.

Primarily, it should be noted that, with reference to certain of the features and mechanisms hereinafter described and claimed, this application is a continuation of my application filed April 2, 1909, Serial Number 487,477.

Other features are improvements which perfect the operation of the machine, render it positive in action, and increase its speed and effectiveness.

Referring to the drawings, 1 indicates the work-plate, 2 the post, 3 the arm and 4 the head of a Wheeler and Wilson two-needle, "vertical-hook" machine, to which I have preferably adapted my invention. The driving shaft 5 in the arm is driven by the combined hand and band wheel 6, said shaft having the double-crank 5ª, to which pitmen 7 are connected which drive the bottom shaft 8, the latter in turn, through meshing-gears 9 and 10, driving the counter-shaft 11. Bevel gears 12 and 13, on the counter-shaft, actuate the bevel-gears 14 and 15 of the hook-shafts, to the upper ends of which hooks 16 and 17 are attached. Bobbins 18 and 19 are carried as usual in said hooks. The hook-shafts are carried by brackets 20 and 21, adjustable longitudinally of the work-plate by slots and screws 22 and 23; and the bevel-gears 12 and 13 are also adjustable on the counter-shaft 11. The needle-bar 24 is reciprocated in bearings in the head 4, as usual, and carries at its lower end a needle-clamp 25, in which are set the two needles 26 and 27. The needle-bar is reciprocated by the crank-disk 28, on the shaft 5, the link 29 connecting the crank 30 to the cross-head 31, the latter being loose on the needle-bar to permit the bar to rotate therein. The cross-head is restrained from vertical movement on the needle-bar by means of the collar 32, set upon the bar by the screws 33, located between the ears 34 of said cross-head; but, the collar 32 enables the link 29 to impart to both the bar and cross-head the necessary vertical reciprocations. The needle-bar has an axial oscillation in its bearings by the sleeve 35 encircling said bar and splined thereto at 36, said sleeve having a groove 37 encircling its lower end in which the end of an angle-plate 38 engages, the vertical portion 39 of said plate being attached by screws 40 to the head 4 of the machine, thus holding the sleeve on the top of said head with ability to move circularly. The sleeve is provided with the ball-extension 41, engaged with head 42, of a rod 43 adjusted thereon, the other end of the rod being pivoted by head 44 to the clamp-collar 45, encircling a flanged-sleeve 46, carried by a pin 47, extending from slide 48, adjustable in groove or way 49 of the arm 50, extending upwardly from the rear end of shaft 51, rocking in bearing 52 of the plate 53, secured to the arm 3, the front end of said shaft 51, having the depending-arm 54, carrying anti-frictional roll 55, engaging the periphery of cam 56, fixed to shaft 57, rotating in a bearing of bracket 58, secured to the face of arm 3. The shaft 57, at its inner end, has the bevel-gear 59 fixed thereto, which meshes with bevel-pinion 60, fixed to shaft 5. Thus, during the reciprocations of the needle-bar, the latter is also oscillated, and the degree of oscillation given said bar is adjusted by setting the slide 48 relatively to the shaft 51, on the arm 50, the position of said slide being fixed by the nut 61, on the screw-threaded end of the pin 47, which draws the slide 48 and sleeve 46 together against the flanges 62 of said arm 50. A coiled-spring 63 is stretched between screw 64, on the bracket 58, and screw 65, on the arm 54, the latter thus being held with its roll 55 in yielding engagement with the cam 56. The form of the cam is important only as it imparts the requisite oscillatory movements to the needle-bar in timed coöperation with its vertical reciprocations, as set forth in my aforesaid application and as will be presently described.

Figure 4:
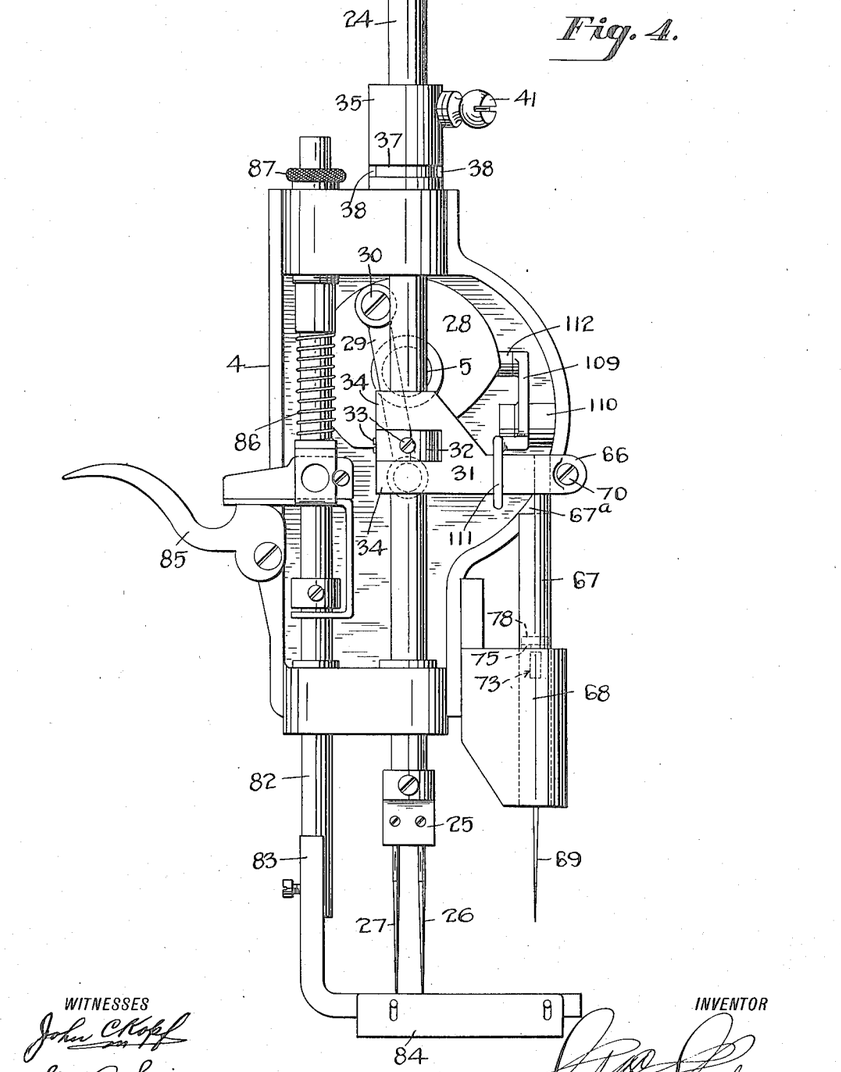
Fig. 4 is an end elevation of the machine with the face-plate removed.
Figure 5:
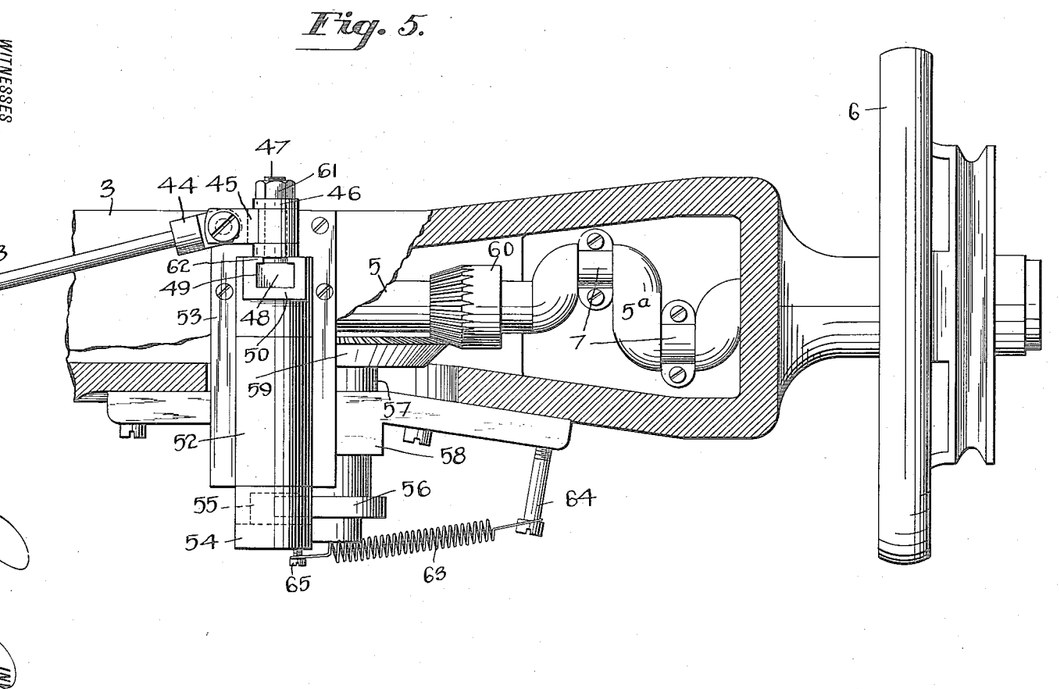
Fig. 5 is a partial top-plan and section of a portion of the arm of the machine showing the actuating means for oscillating the needle-bar.
Figure 6:
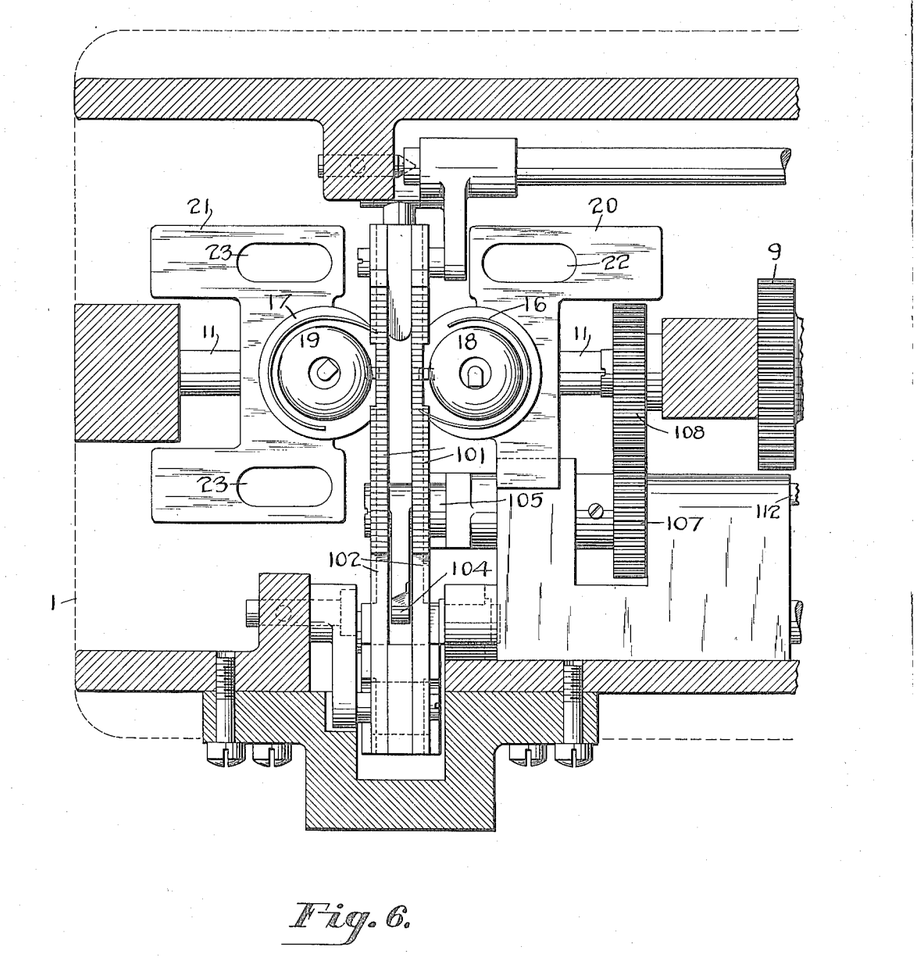
Fig. 6 is a horizontal section of the front end of the machine taken just below the work-plate.
Figure 9:
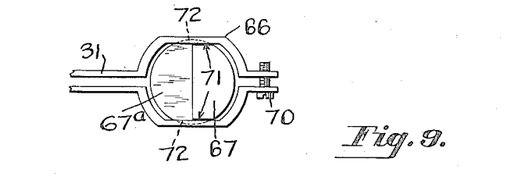
Fig. 9 is a detail view showing in top-plan the blade-bar and the clamping means therefor carried by the cross-head.

The cross-head 31 is formed into a clamp 66, at its outer end, said clamp embracing the upper end of the bar 67, reciprocating in bearing 68 and carrying at its lower end the thread-extracting blade 69. The clamp is closed upon the upper end of the bar 67, by screw 70, passing through the ends of the clamp,—Figs. 1, 4 and 9. The upper end of the bar 67 is slabbed off on opposite sides at 71, Fig. 9, for coöperation with the arms of clamp 66, said arms, in the proper position of the bar, resting upon the shoulders 72, produced by slabbing the bar. This structure has the several functions of preventing the bar from turning in the clamp and relatively to the needle-bar, preventing the deflecting-blade from turning out of operative position and of operating as a stop by which to set the bar in operation, and prevent it from being set in any but the proper position both vertically and axially.

Figure 10:
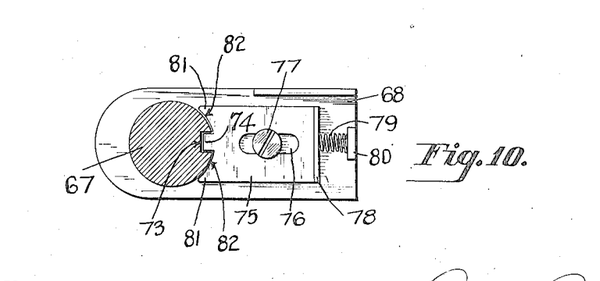
Fig. 10 is a partial plan and section showing the details of the means for holding the blade-bar elevated, or in an inoperative position.

In order that the blade-bar may be elevated or thrown out of operative position, the bar is provided with a longitudinal recess 73, into which a projection 74 may extend, said projection being carried at one end of a plate 75, at rest upon the bearing 68, said plate 75 being provided with an elongated slot 76, through which passes a screw 77, tapped into the bearing 68, and the head of which presses said plate firmly against said bearing 68 to hold the plate retracted and out of operative position. The rear end of the plate 75 is provided with a vertical extension 78, by which the same may be manipulated; but, the plate, after loosening the screw 77, may be automatically forced into coöperation with the bar 67, by coiled-spring 79, to cause the projection 74, of the plate 75, to enter the recess 73 of the bar and thus hold the latter in elevated position after said bar has been raised to move the blade 69 to an inoperative position. The spring 79 bears at one end against the extension 78, and at its opposite end against a lug 80, which holds the spring, as shown in Fig. 10. In order that the projection 74 may be properly centered and automatically find the recess 73 in the blade-bar, the plate 75 is provided with projections 81 and curved recesses 82, the latter conforming to the curvature of the blade-bar and the projections 81 embracing said bar when the plate is moved into engagement therewith. By this means the blade-bar can be put into and out of operation at will so as to convert the machine into a hemstitching, or combination thread-drawing and hemstitching, machine; and in this particular machine, which is, as before stated, a particular type of Wheeler and Wilson, to which my invention has been adapted, the blade bar 67 is reduced at one side, as at 67$^a$, to provide for the elevation of said bar and, when thus elevated, to prevent the bar from interfering with the action of the take-up, as will be clearly seen upon reference to Fig. 4.

The usual presser-bar is indicated by 82 and carries at its lower end the foot-shank 83, the branches of which carry the spring-controlled, yielding foot-portions 84, all as disclosed in my aforesaid application. The bar may be raised by the usual lever 85 and depressed by the spring 86, the tension of which is adjusted by the screw-bearing 87.

Figure 7:
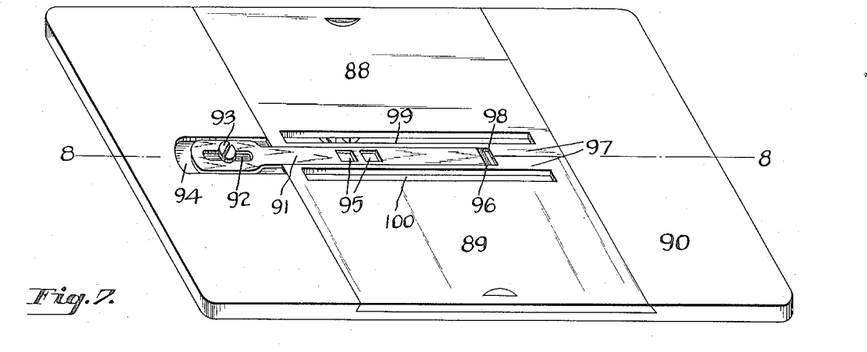
Fig. 7 is a perspective view showing the work-plate of the machine.
Figure 8:
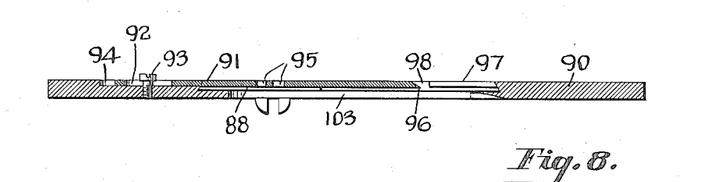
Fig. 8 is a central, vertical section on the line 8—8 of Fig. 7.

The needles, in descending, and, likewise, the deflecting-blade pass between two plates 88 and 89, which are dove-tailed into the work-plate 90, thus enabling inspection of the bobbins and loopers. The plates 88 and 89 close against the sides of a filling-plate 91, which is adjustable transversely of the work-plate 90, by means of the elongated slot 92, in one end thereof, through which passes the screw 93, tapped into the work-plate, said end of the filling-plate being set in the recess 94 of the work-plate, so as to make the surfaces of the filling-plate and work-plate flush. The filling-plate is provided with apertures 95, one in advance of the other in the line of feed, through which the needles reciprocate and in which they vibrate during the operation of the machine. The forward end of the filling-plate is provided with a cutting edge 96, formed by beveling the end of said plate. The plates 88 and 89, just in advance of the cutting edge 96 of the filling-plate, are formed with projections, as at 97, to close the front end of the slot between said plates, which is occupied by the filling-plate; but the latter is so set for operation as to leave an aperture 98, in which reciprocates the deflecting-blade 69. The plate 88 is provided with a feed-slot 99 and the plate 89 is provided with a feed-slot 100, each receiving one of the feed-dogs 101, carried by the feed-bars 102. As shown in Fig. 8, the work-plate of the machine is cut away on its bottom, as at 103, at opposite sides, leaving an open space which is bridged by both plates 88 and 89 and the filling-plate 91. The recess or opening thus provided permits the free operation of the rotary cutter 104, which is carried by the crank 105, on the forward end of a short shaft 106, upon which is secured the gear 107, meshing with the gear 108, carried on the forward end of the shaft 8. This cutting-blade and its driving mechanism is in all respects substantially the same as that set forth in my aforesaid application; but the importance of the disposition and operation of the same is that the cutting-blade 104 rotates in the general direction of the feed of the work and into coöperation with the forward end 96 of the filling-plate 91, said forward end having been reduced to a cutting edge by beveling the same, as shown in Figs. 7 and 8. By this arrangement of parts, the rotary cutter 104, in its operation, tends to carry the deflected threads, or the threads of the body of the work deflected by the blade 69, into coöperation with the ledger-blade and this movement is in correspondence with the feed movement of the machine, which causes the feed-dogs to traverse the work so that said deflected threads will be moved toward the ledger-blade. The result of this arrangement is that there is no possibility of any of the threads deflected by the blade 69 being skipped or brushed aside, or carried out of the range of action of the thread-cutter. The importance of the recess or opening 103, in which the rotary cutter operates, is that the cutting mechanism is elevated into the nearest possible relation to the bottom of the work and to the connection therewith of the deflected threads, thus enabling the cutting mechanism to clean the deflected threads perfectly from the work. And it is to be understood that the filling-plate is just as thin as, mechanically and practically, it may be made, so that, in the operation of the cutting-mechanism, the cutting edges are brought into engagement with the deflected threads just as close to the work as can be.

The feeding mechanism may be of the usual four motion type, or may be such as is disclosed in my aforesaid application; but, the importance of this feature of my invention resides in the fact that the feeding mechanism imparts to the feed-dogs an intermittent, progressive movement, in contradistinction to such feeding mechanisms as impart to the dogs one or more retrograde movements during its cycle of operations, or a single feeding movement to two or more reciprocations of the needle-bar, or two or more stitches made by the stitch-forming mechanism. In other words, my feeding mechanism imparts to the feed-dogs a forward feed movement for every complete stitch made by the machine, or for every vertical reciprocation of the needle-bar. The importance of this feature of my invention is that the speed of the machine, over ordinary hemstitching machines, is doubled as to some and tripled as to others, and no possibility of the thread becoming entangled is encountered. Further details of the feeding mechanism are not here given since it would only cumber the description as to specific details, which form no part of my present invention.

Another important feature of my invention, concerned in the rotation of the cutter 104 in the general direction of the feed of the work and between the two feed-dogs, is that, in the rapid operation of the machine, a considerable suction is produced down through the apertures in the work-plate, which will control the disposition of the lint and carry it away from the stitching mechanism, or the loopers thereof, or from the other operative parts of the machine. This is an important advantage, as it is well known that the lint produced by the deflecting and thread-cutting mechanisms, if not disposed of in some way, will eventually fill up on the feed-bar and between it and the slide-plates, and filling-plate, or ledger-blade and tend to put the machine out of action, or render it necessary to periodically suspend operation for the purpose of cleaning away the lint and fuzz which gradually accumulates in the operation of the machine.

Figure 1:
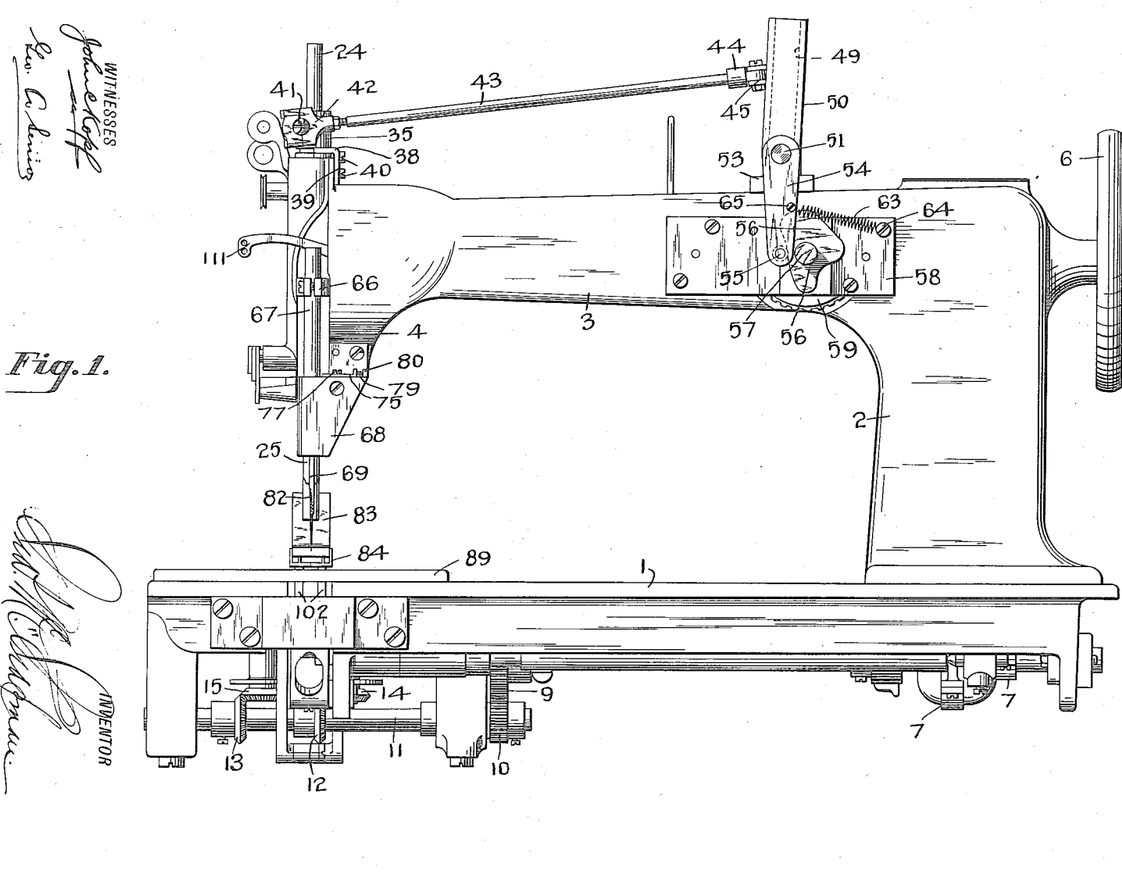
Figure 1 is a side elevation of a machine embodying my invention.
Figure 2:
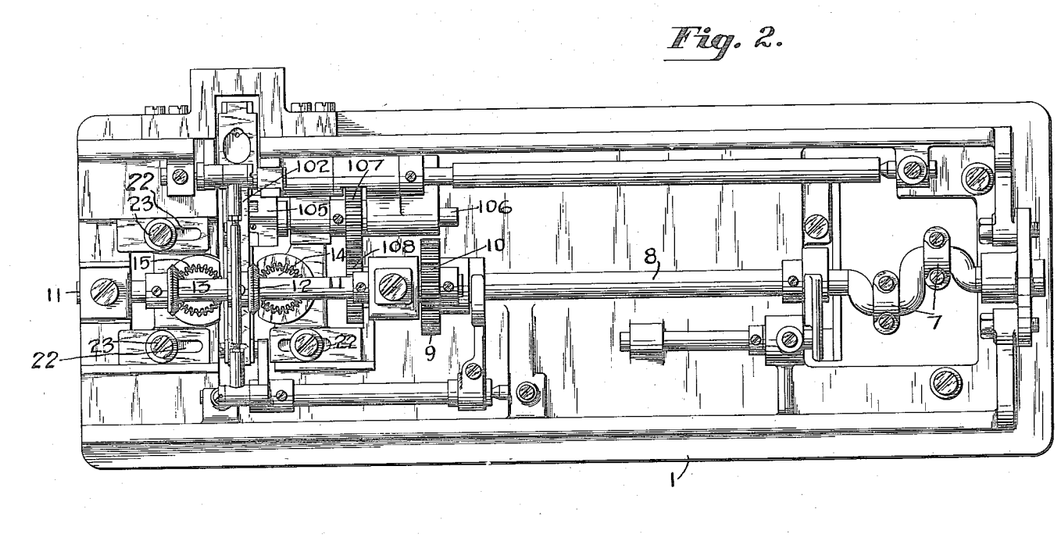
Fig. 2 is a bottom-plan view of the machine.
Figure 3:
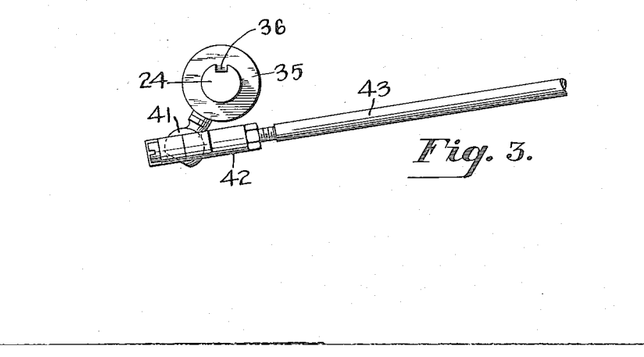
Fig. 3 is a detail top-plan showing the connection between the needle-bar and the means for oscillating the same.

Another important feature of my present invention resides in the coöperative arrangement of the take-up, the thread-deflecting bar, and the means for actuating the latter; that is to say, the take-up 109, which is journaled at 110, in the head of the machine, extends with its thread-controlling arm 111 forward from the face-plate of the machine, as shown in Fig. 1, and vibrates through the action of the usual cam-groove in the crank-disk 28, operating the arm 112. The vibratory action of the take-up is in a plane above the cross-head 31, and at one side of the blade-bar 67, see Fig. 4; and, because of the position of the take-up in the machine, the blade-bar 67 has been cut away as at 67ª, so as not to interfere with the action of the take-up, or with the adjustment of the blade-bar. This will be understood upon the consideration that, when it is desired to throw the blade-bar out of operation by lifting the same and bringing into action the retaining means shown in detail in Fig. 10, the upper slabbed-off portion of the blade-bar 67 will be elevated to a position at one side of the take-up lever, the cut-away portion 67ª being sufficient to accommodate this movement of the blade-bar and avoid interference with the take-up lever. Upon reference to Figs. 1, 9 and 10, it will be seen that, in order to elevate the blade-bar to an inoperative position, the head of the clamping-screw 77 should first be released from engagement with the plate 75, which will enable the spring 79 to force said plate forward into engagement with the blade-bar 67. The screw 70 should then be released, which will enable the arms of the crank 66 to materially spring open and release the blade-bar, and the releasing action of said arms will cause the same to clear the shoulders 72 of the blade-bar, thus permitting the latter to be elevated by hand until the projection 74, on the plate 75, is caused to enter the recess 73 in said blade-bar. When this occurs, said bar will be raised so high as to prevent interference with the work in the machine and also to prevent the shoulders 72 from being engaged again by the crank-arms until the bar is to be again placed in action. Of course, the clamp-arms of the cross-head will simply slide vertically relatively to the blade-bar; and the retaining-plate 75 will hold the bar from movement either axially, or vertically. By this construction and arrangement of parts, the take-up is not interfered with and the blade-bar may be put out of action at the will of the operator and the machine thus made convertible into a simple zigzag-stitch machine, or into a thread-drawing and hem-stitching machine, or into a simple thread-drawing machine, by removing the needles 26 and 27 from the needle-clamp.

The form of the needle-bar cam 56 is such as to control the axial movement of the needle-bar relatively to its vertical reciprocations in the same manner as set forth in my aforesaid application; that is to say, the needle-bar, during its vertical reciprocations, is given axial movements so as to vibrate the needles across the edges of the thread-drawn line in such timed relation as to cause the needles to first descend through the body of the work on opposite sides of the thread-drawn line and then to be swung into alinement with the deflecting-blade 69, so as to enter the openings produced by the drawn threads, and while thus in said openings to have a lateral movement into position to cause the loops thrown out by them to be engaged by the loopers, the third reciprocation of the needle-bar being the same as the second, thus causing two reciprocations and lateral movements of the needles in the open work of the thread-drawn line. This constitutes the cycle of movements of the needle-bar; and, at the same time, the work is fed progressively forward once for every reciprocation of the needle-bar and the loopers are caused to rotate so as to make a stitch for every reciprocation of the needle-bar, and, likewise, the thread-deflecting blade is caused to reciprocate once for every stitch, once for every feed, and once for every reciprocation of the needle-bar. Likewise, for every reciprocation of the blade-bar, the cutter is given a complete rotation to cause its cutting edge to coöperate with the ledger-blade and sever the threads deflected by said blade.

From the foregoing detailed description and the mode of operation of the various parts, it will be seen that I have produced a compact, cheap and high-speed combination thread-drawing and hemstitching machine, as well as a machine capable of being converted into either a simple thread-drawing machine, a simple zigzag-stitch machine, or hemstitch machine, or combination thread-drawing and hemstitching machine. And it will also be understood that the character of cam used at 56 will control the axial movement of the needle-bar with reference to its vertical reciprocations.

An interference having been declared involving the subject-matter of claim 5 as originally presented, and said claim 5 having been construed to cover, and to be broad enough to read upon, the structure of the other parties to the interference, I hereby disclaim said subject-matter as follows: "In combination mechanism for removing body threads from fabric to produce drawn work; feeding mechanism having two separated feed dogs for advancing the work to the thread drawing mechanism; a filling plate arranged between the said feed dogs and having one end formed with a cutting edge; and a cutting blade coöperating with the cutting edge of the filling plate whereby to cut the threads drawn by the thread drawing mechanism."

Having thus described my invention, what I claim and desire to secure by Letters Patent is:

1. In combination with mechanism for deflecting threads of the body-fabric, feeding mechanism for advancing the work to the deflecting mechanism, and a thread-cutting mechanism comprising two coöperating devices, one of which has its thread-cutting movement in the general direction of feed of the work.

2. In combination with mechanism for deflecting threads of the body-fabric, feeding mechanism for advancing the work to the deflecting mechanism, and a cutting mechanism for cutting the deflected threads including a stationary blade and a coöperating movable blade, the stationary blade being arranged in the line of feed so that the deflected threads will be carried into coöperation therewith by the feeding mechanism.

3. In combination with mechanism for deflecting threads of the body-fabric, feeding mechanism for advancing the work to the deflecting mechanism, and a thread-cutting mechanism for cutting the deflected threads including a stationary blade and a coöperating movable blade, the stationary blade being arranged in the line of feed so that the deflected threads will be carried into coöperation therewith by the feeding mechanism, and the movable blade having its thread-cutting movement in the general direction of feed of the work so as to carry deflected threads against the stationary blade.

4. In a machine for removing body-threads from fabric to produce drawn work; a thread deflecting device; feeding mechanism for advancing the work to the thread-deflecting device; and cutting mechanism including a trimmer comprising a stationary blade and a movable blade, the latter having its functional or thread-cutting movement in the direction of the feed of the work.

5. In a machine of the character described, a thread-deflecting bar, means for reciprocating said bar, means whereby said bar may be released from the reciprocating means, and means for holding said bar in its elevated position.

6. In combination with the stitch-forming mechanism of a sewing machine, a thread-drawing mechanism including a blade-bar, a take-up arranged at the forward end of the machine, the take-up having its vibratory movements between the needle-bar of the stitch-forming mechanism and the blade-bar of the thread-drawing mechanism.

7. A thread-drawing machine having, in combination, a vertically reciprocating bar carrying a thread-deflecting blade, means for reciprocating said bar including a crank-disk, a link connected to said crank-disk, a cross-head connection between the crank-disk and the blade-bar, means for rigidly connecting the blade-bar to the cross-head, and means for pivotally connecting said cross-head to said link.

8. In a thread-drawing machine, a thread-drawing mechanism including a reciprocating, blade-carrying bar, means for actuating said bar including a rotary crank, a reciprocating cross-head, a link connection between the crank and cross-head, and a clamp carried by the cross-head for removably connecting the blade-bar to the latter.

9. A thread-drawing machine having, in combination, thread-drawing mechanism including a blade-bar, means for vertically reciprocating the blade-bar of the thread-drawing mechanism, means for detachably connecting said bar to the reciprocating means and means whereby the blade-bar may be set infallibly in the same position for operation in the machine.

10. A thread-drawing machine having, in combination, a feeding mechanism, and a thread-drawing mechanism, the latter comprising a reciprocating thread-deflecting blade, a stationary thread-cutting member, and a circularly moving coöperating member, the direction of movement of the latter while cutting being in the general direction of the feed.

11. A thread-drawing machine having, in combination, a feeding mechanism, and a thread-drawing mechanism comprising thread deflecting means and cutting means, the latter including a means by which the drawn threads may be forced away from the cutting position.

12. A thread-drawing machine having, in combination, a feeding mechanism provided with separated feed-dogs, and a thread-drawing mechanism operating between the said feed-dogs and including a means by which the drawn-threads may be driven away from the thread-drawing position.

13. A thread-drawing machine having, in combination, means for feeding the work, and a thread-drawing mechanism including a vertically reciprocating bar carrying a thread-deflecting blade, a circularly moving cutter, and a coöperating stationary cutter, and means for actuating the several parts, including a rotary shaft and connections to the feeding means, a rotary counter-shaft and connections to the cutter, and a main rotary driving shaft and connections to the reciprocating bar.

14. In combination, in a mechanism for removing body threads from fabric to produce drawn work; thread deflecting mechanism; feeding mechanism having two separated feed-dogs for advancing the work to the thread-deflecting mechanism; a filling plate arranged between the said feed-dogs, and having one end formed with a cutting edge presented toward the front of the machine; and a cutting-blade coöperating with the cutting-edge of the filling plate whereby to cut the deflected threads.

15. In combination, in a mechanism for removing body threads from fabric to produce drawn-work; thread-deflecting mechanism; feeding mechanism for advancing the work to the thread-deflecting mechanism; a filling plate extending from a position in rear of the thread-deflecting mechanism to substantially the position of the latter, and provided at its front end with a cutting-edge; and a cutting-blade coöperating with the cutting-edge of the filling plate whereby to cut the deflected threads.

16. In combination, in a mechanism for removing body threads from fabric to produce drawn-work; thread-deflecting mechanism; feeding mechanism having two separated feed-dogs for advancing the work to the thread-deflecting mechanism; work-supporting means arranged about the thread-deflecting position comprising two slide plates having slots through which the feed-dogs work, and also having coöperating projections for forming a slot between the feed-dogs; a filling plate, extending within said slot to a point just in rear of the thread-deflecting position, having a cutting-edge; and a cutting-blade coöperating with the cutting-edge of the filling plate, whereby to cut the deflected threads.

17. In combination, in a mechanism for removing body threads from fabric to produce drawn-work; thread-deflecting mechanism; feeding mechanism having two separated feed-dogs for advancing the work to the thread-deflecting mechanism; work-supporting means arranged about the thread-deflecting position comprising two slide plates having slots through which the feed-dogs work, and also having coöperating projections for forming a slot between the feed-dogs; a filling plate, extending within said slot to a point just in rear of the thread-deflecting position, having a cutting-edge; means for adjusting the filling plate toward and from the cutting position; and a cutting-blade coöperating with the cutting-edge of the filling plate, whereby to cut the deflected threads.

In testimony whereof I have hereunto signed my name in the presence of two subscribing witnesses.

CHAS. McC. CHAPMAN.

Witnesses:
M. HERSKOVITZ,
ANNA MARIE WALL.